UNITED STATES PATENT OFFICE.

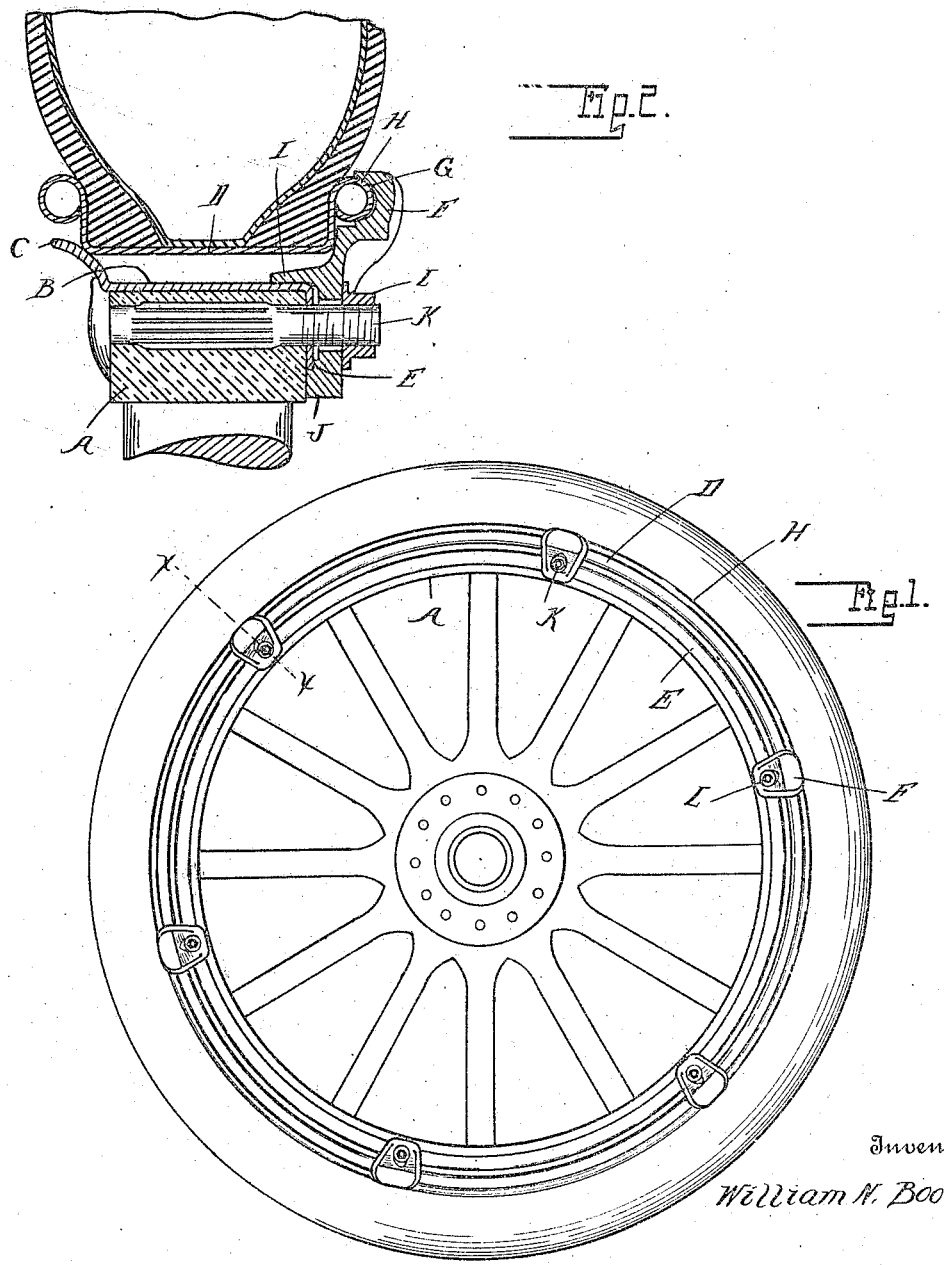

WILLIAM N. BOOTH, OF DETROIT, MICHIGAN, ASSIGNOR TO KELSEY WHEEL COMPANY, INC., OF DETROIT, MICHIGAN, A CORPORATION OF NEW YORK.

DEMOUNTABLE-RIM-SECURING DEVICE FOR VEHICLE-WHEELS.

1,299,903.  Specification of Letters Patent.  Patented Apr. 8, 1919.

Application filed May 11, 1916. Serial No. 96,773.

*To all whom it may concern:*

Be it known that I, WILLIAM N. BOOTH, a citizen of the United States of America, residing at Detroit, in the county of Wayne and State of Michigan, have invented certain new and useful Improvements in Demountable-Rim-Securing Devices for Vehicle-Wheels, of which the following is a specification, reference being had therein to the accompanying drawings.

The invention relates to demountable rims for vehicle wheels, and comprises the novel construction of the rim securing means as hereinafter set forth.

In the drawings:

Figure 1 is a side elevation of a wheel embodying my invention; and

Fig. 2 is a cross-section on line $x—x$ Fig. 1.

A is the felly of a vehicle wheel, which is provided with a fixed metallic rim B, having a projecting flange C at one side thereof forming a bearing for the demountable rim D. The rim B is also preferably provided with an inwardly-extending flange E upon the opposite side of the felly from the flange C. F represents securing lugs for clamping the demountable rim D upon the wheel. Heretofore it has been the practice to secure the demountable rim by wedge lugs, which are inserted between the fixed rim and demountable rim and are drawn laterally inward by clamping bolts. By tightening the clamping bolts uniformly the wedges will force the demountable rim on to the felly and also space it uniformly from the fixed rim, so as to obtain a concentric arrangement of the two rims. If, however, the wedges are not clamped equally the demountable rim will be forced out farther on one side than upon the opposite side, making it eccentric to the axis. Also the wedging effect will distort the demountable rim, giving it a more or less polygonal form instead of that of a true circle.

It is the principal object of the present invention to avoid distortion of the demountable rim and to insure the clamping of the same into absolutely concentric relation to the axis of the wheel. To accomplish this the lugs F are so constructed as to operate as tie connections and spacers as well as clamps for holding the rim against the seat flange C.

In detail, the lugs F are formed with bearing portions which interlock with complementary portions upon the demountable and fixed rims. As shown, the outer end of the lug is grooved at G to fit over the bead H at the edge of the demountable rim D, and there is also provided inwardly-extending projections I and J, which respectively pass over the periphery of the rim B and inside of the inner edge of the flange E. Thus the projections I and J hold the lug F from radial movement with respect to the rim B, while the groove G engaging the bead H holds the demountable rim D from radial movement. The lugs F are secured by clamping the bolts K, which pass through the felly and are provided with nuts L engaging the threaded end portions thereof.

In use, the rim is clamped by tightening the nuts L upon the bolts K, but inasmuch as the lugs F constitute tie connections of fixed length, there will be no tendency to force the demountable rim either inward or outward and therefore there is no danger of distorting the rim by unequal clamping of the lugs.

What I claim as my invention is:—

1. The combination with a wheel felly, having a fixed metallic rim provided with an inclined bearing on one side thereof and an inwardly-extending flange on the opposite side thereof, of a demountable rim having beads on its edges and adapted to engage the inclined bearing on the fixed rim, and clamping lugs adjustably secured to the wheel felly and embracing the outer and inner edges of the inwardly-extending flange and having bearings adapted to embrace the bead at one edge of the rim.

2. The combination with a wheel felly, having a felly band provided with an inclined bearing and an inwardly-extending flange on opposite sides thereof, of a demountable rim adapted to engage said inclined bearing, clamping lugs having projections for respectively passing over the periphery of said felly band and inside of the inner edge of said flange, said clamping lugs also having bearings for engaging said demountable rim to hold the same from radial movement in either direction, and means for securing said clamping lugs in place.

In testimony whereof I affix my signature.

WILLIAM N. BOOTH.